US011281925B2

(12) United States Patent
Li et al.

(10) Patent No.: US 11,281,925 B2
(45) Date of Patent: Mar. 22, 2022

(54) METHOD AND TERMINAL FOR RECOGNIZING OBJECT NODE IN IMAGE, AND COMPUTER-READABLE STORAGE MEDIUM

(71) Applicant: TENCENT TECHNOLOGY (SHENZHEN) COMPANY LIMITED, Shenzhen (CN)

(72) Inventors: Feng Li, Shenzhen (CN); Xiaoxiang Zuo, Shenzhen (CN); Haoyuan Li, Shenzhen (CN); Jun Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 15 days.

(21) Appl. No.: 16/902,235

(22) Filed: Jun. 15, 2020

(65) Prior Publication Data

US 2020/0311453 A1 Oct. 1, 2020

Related U.S. Application Data

(63) Continuation of application No. PCT/CN2019/077843, filed on Mar. 12, 2019.

(30) Foreign Application Priority Data

Apr. 16, 2018 (CN) .......................... 201810346029.3

(51) Int. Cl.
*G06K 9/20* (2006.01)
*G06K 9/62* (2006.01)
(52) U.S. Cl.
CPC .......... *G06K 9/2054* (2013.01); *G06K 9/629* (2013.01); *G06K 9/6298* (2013.01)

(58) Field of Classification Search
None
See application file for complete search history.

(56) References Cited

U.S. PATENT DOCUMENTS

| 10,496,884 B1* | 12/2019 | Nguyen ............... G06N 3/0454 |
| 2014/0046922 A1 | 2/2014 | Crook et al. |
| 2017/0177087 A1* | 6/2017 | Lerner .................. G06F 3/0304 |
| 2018/0268240 A1* | 9/2018 | Loce ...................... G11B 27/105 |
| 2019/0080456 A1* | 3/2019 | Song ....................... G06T 7/174 |
| 2019/0279391 A1* | 9/2019 | Narikawa ................ G06T 7/70 |

FOREIGN PATENT DOCUMENTS

| CN | 102567703 A | 7/2012 |
| CN | 106055091 A | 10/2016 |

(Continued)

OTHER PUBLICATIONS

Long, Jonathan, Evan Shelhamer, and Trevor Darrell. "Fully convolutional networks for semantic segmentation." In Proceedings of the IEEE conference on computer vision and pattern recognition, pp. 3431-3440. 2015. (Year: 2015).*

(Continued)

*Primary Examiner* — David Perlman
(74) *Attorney, Agent, or Firm* — Anova Law Group, PLLC

(57) ABSTRACT

A method for recognizing object nodes in an image includes: performing image detection on an original image, to determine a target image region that comprises a target image object, the original image being a two-dimensional image; performing image cropping on the original image according to the target image region, to obtain a subimage comprising the target image object; and performing node recognition on the subimage based on a preset node recognition model, to obtain image position information of each node of the target image object in the original image.

20 Claims, 9 Drawing Sheets

(56) References Cited

FOREIGN PATENT DOCUMENTS

| CN | 106846403 | A |   | 6/2017 |
|----|-----------|---|---|--------|
| CN | 107239727 | A |   | 10/2017 |
| CN | 107341517 | A |   | 11/2017 |
| CN | 107423698 | A | * | 12/2017 |
| CN | 107423698 | A |   | 12/2017 |
| CN | 107451568 | A |   | 12/2017 |
| CN | 107578023 | A |   | 1/2018 |
| CN | 108520247 | A |   | 9/2018 |

OTHER PUBLICATIONS

The World Intellectual Property Organization (WIPO) International Search Report for PCT/CN2019/077843 dated Jun. 17, 2019 7 Pages (including translation).

The State Intellectual Property Office of the People's Republic of China (SIPO) Office Action 1 for 201810346029.3 dated Jul. 26, 2019 12 Pages (including translation).

The State Intellectual Property Office of the People's Republic of China (SIPO) Office Action 2 for 201810346029.3 dated Oct. 22, 2019 11 Pages (including translation).

The European Patent Office (EPO) The Extended European Search Report for 19787687.3 dated Nov. 30, 2021 7 Pages.

Yilun Chen et al., "Cascaded Pyramid Network for Multi-Person Pose Estimation," Eye In-Painting With Exemplar Generative Adversarial Networks, Apr. 8, 2018 (Apr. 8, 2018), pp. 7103-7112, Retrieved from the Internet:URL: https://arxiv.org/pdf/1711.07319v2.pdf. 10 pages.

Tsung-Yi Lin et al., "Feature Pyramid Networks for Object Detection," 2017 IEEE Conference On Computer Vision and Pattern Recognition (CVPR), IEEE Computer Society, US, Jul. 21, 2017 (Jul. 21, 2017), pp. 936-944. 9 pages.

* cited by examiner

METHOD AND TERMINAL FOR RECOGNIZING OBJECT NODE IN IMAGE, AND COMPUTER-READABLE STORAGE MEDIUM

CROSS-REFERENCES TO RELATED APPLICATIONS

This application is a continuation application of PCT Patent Application No. PCT/CN2019/077843, filed on Mar. 12, 2019, which claims priority to Chinese Patent Application No. 2018103460293, entitled "METHOD AND APPARATUS FOR RECOGNIZING OBJECT NODE IN IMAGE, TERMINAL, AND READABLE MEDIUM" filed with the Chinese Patent Office on Apr. 16, 2018, the entire contents of both of which are incorporated herein by reference.

FIELD OF TECHNOLOGY

The present disclosure relates to the field of information processing technologies, and in particular, to a method and an apparatus for recognizing an object node in an image, a terminal, and a computer-readable storage medium.

BACKGROUND OF THE DISCLOSURE

With the popularization of the concept of Artificial Intelligence (AI), image recognition has become a popular research topic. The so-called image recognition, as an important field of AI, is a technology for processing, analyzing and understanding an image by using a computer, to recognize targets and objects in different modes. The objects in the image may refer to a text, an item, a gesture, and the like. How to better recognize an image object becomes a research focus.

SUMMARY

According to embodiments of the present disclosure, a method and an apparatus for recognizing an object node in an image, a terminal, and a computer-readable storage medium are provided.

One aspect of the present disclosure provides a method for recognizing an object node in an image, executed by a computer device. The method includes: performing image detection on an original image, to determine a target image region that comprises a target image object, the original image being a two-dimensional image; performing image cropping on the original image according to the target image region, to obtain a subimage comprising the target image object; and performing node recognition on the subimage based on a preset node recognition model, to obtain image position information of each node of the target image object in the original image.

Another aspect of the present disclosure provides an intelligent terminal, including a processor and a memory coupled to the processor. The processor is configured to: perform image detection on an original image, to determine a target image region that comprises a target image object, the original image being a two-dimensional image; perform image cropping on the original image according to the target image region, to obtain a subimage comprising the target image object; and perform node recognition on the subimage based on a preset node recognition model, to obtain image position information of each node of the target image object in the original image.

Another aspect of the present disclosure provides a non-transitory computer-readable storage medium, storing a computer program instruction. The computer program instruction, when executed, can cause a processor to perform image detection on an original image, to determine a target image region that comprises a target image object, the original image being a two-dimensional image; perform image cropping on the original image according to the target image region, to obtain a subimage comprising the target image object; and perform node recognition on the subimage based on a preset node recognition model, to obtain image position information of each node of the target image object in the original image.

Details of one or more embodiments of the present disclosure are provided in the accompany drawings and descriptions below. Other features, objectives, and advantages of the present disclosure will become apparent from the specification, the accompanying drawings, and the claims.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used to describe the present disclosure, instead of limiting the present disclosure.

In the embodiments of the present disclosure, a method for recognizing an object node in an image is provided. The recognition method includes detecting and cropping an original image to obtain a subimage including a target image object, and then invoking a preset node recognition model to perform node recognition on the subimage, to obtain node recognition information of the target image object included in the original image. The node recognition information includes image position of the recognized nodes of the target image object in the original image. In the embodiments of the present disclosure, during a node recognition process, node recognition may only be performed on the subimage, instead of performing node recognition on the entire original image, to avoid recognizing other image objects similar to the target image object in the original image, thereby improving the precision of image recognition.

Figure 1:
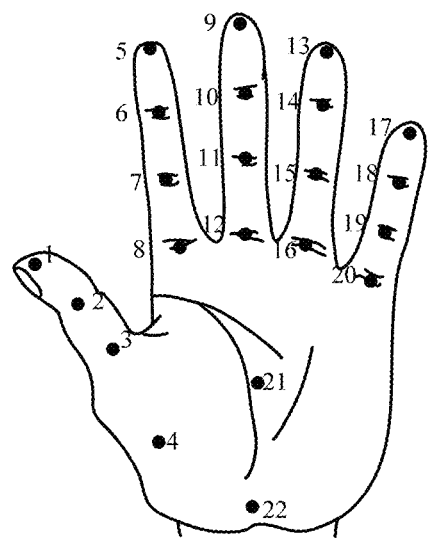
FIG. 1 is a schematic diagram of a hand gesture image according to an embodiment of the present disclosure.
Figure 2:
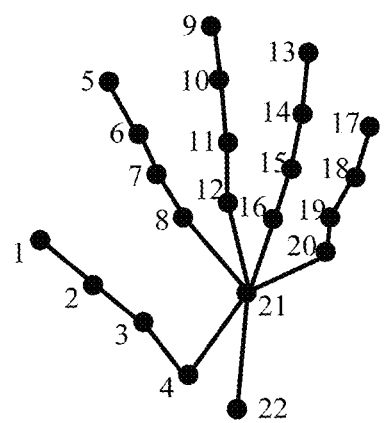
FIG. 2 is a schematic diagram of a hand gesture skeleton image according to an embodiment of the present disclosure.
Figure 3A:
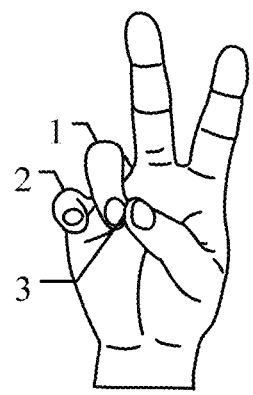
FIG. 3a is a schematic diagram of a hand gesture image according to an embodiment of the present disclosure.
Figure 3B:
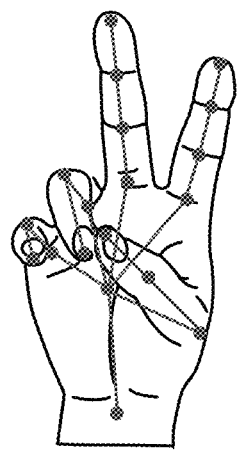
FIG. 3b is a schematic diagram of a hand gesture skeleton image according to an embodiment of the present disclosure.

In an embodiment, the method for recognizing an object node in an image may be applied to hand gesture skeleton recognition. The so-called hand gesture skeleton recognition means recognizing main joint points of a hand in an image, and then connecting the recognized joint points in a preset manner to form a skeleton image of the hand. 22 nodes of a palm are used as an example, as shown in FIG. 1 to FIG. 2. FIG. 1 shows a hand gesture of an open palm. Through hand gesture skeleton recognition, a hand gesture skeleton image corresponding to the hand gesture in FIG. 1 may be recognized, and the hand gesture skeleton image may be as shown in FIG. 2. The recognition method in the embodiments of the present disclosure may also be used for recognizing a hand gesture in FIG. 3a. According to the embodiments of the present disclosure, not only the V hand gesture in FIG. 3a but also a bending node 1 of a ring finger, a bending node 2 of a little finger, a junction 3 of a thumb and the ring finger, and other hidden nodes can be recognized, thereby obtaining a hand gesture skeleton image shown in FIG. 3b. It can be seen that, the method for recognizing an object node in an image according to the embodiments of the present disclosure can recognize key nodes (including hidden nodes) of the entire palm, and a joint position and direction of each finger of the palm can be recognized based on the recognized key nodes, thereby obtaining a hand gesture skeleton image. In the present disclosure, 2D coordinates of a hand gesture skeleton may be predicted based on an image generated by a camera of a device such as an intelligent terminal, and a position and a direction of any joint point of a hand may be recognized. Based on the disclosed method, complex hand gestures may be identified based on recognized nodes in the image such as position relationships between these nodes. For example, the terminal may first determine which finger each node belongs to, connect nodes belonging the same finger, compare connection pattern of the nodes with preset patterns of known gestures (e.g., Victory hand, thumbs up, thumbs down, number-counting gesture, etc.), and determine the gesture corresponding to the current image.

Figure 4:
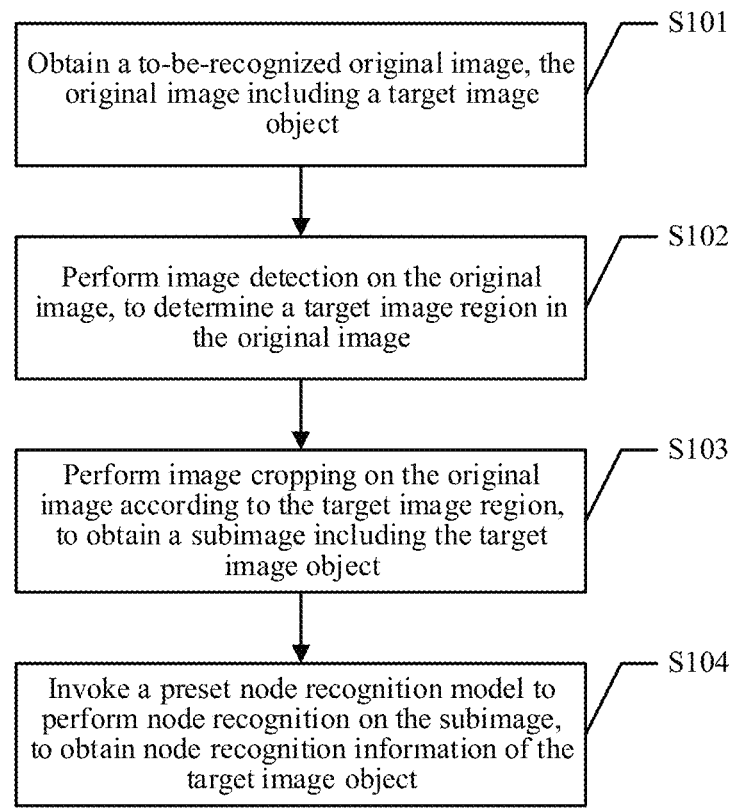
FIG. 4 is a schematic flowchart of a method for recognizing an object node in an image according to the present disclosure.

In an embodiment, a schematic flowchart of a method for recognizing an object node in an image is shown in FIG. 4. The method in some embodiments of the present disclosure may be implemented by an intelligent terminal, for example, a mobile intelligent terminal such as a smartphone or a tablet computer, or implemented by some intelligent terminals that perform man-machine interaction based on hand gesture recognition, for example, a motion sensing game device with a camera or a motion sensing control device.

During startup, such intelligent terminals may turn on a camera to acquire data. In S101, a to-be-recognized original image may be obtained based on the camera. The original image includes a target image object, and the target image object mainly includes a palm of a user. The user is required to put the palm in a shooting range of the camera, so that the palm can be photographed for hand gesture skeleton recognition. In an image taken by the camera, initial hand gesture recognition and estimation may be performed. If it is recognized that the image does not include a palm, this step is performed continuously.

The terminal may obtain a to-be-recognized original image according to a processing instruction inputted by the user. For example, when the user wants to know node information of the target image object in the original image, the user may input a processing instruction to the terminal, to instruct the terminal to obtain the to-be-recognized original image and perform node recognition processing on the original image. The processing instruction may be a press instruction or a click instruction for the terminal, or a voice instruction transmitted to the terminal, or the like, and is not limited in this embodiment of the present disclosure. In an embodiment, the terminal may further actively obtain the to-be-recognized original image according to a service requirement, and perform node recognition processing on the original image. For example, the service requirement may be hand gesture photographing. When the user uses a hand gesture to take a photo, the terminal may take an image only after a specified hand gesture of the user is detected. Therefore, after detecting that the user enables a camera function of the terminal, the terminal actively obtains a to-be-recognized original image taken by a camera component, and performs node recognition processing on the original image.

In some embodiments, the original image is a two-dimensional image. That is, the disclosed method can be implemented on a single 2D image without depth information, for example, to identify nodes of a hand in the single image for complex hand gesture recognition.

After obtaining the original image including the target image object, in S102, image detection may be performed on the original image, to determine a target image region in the original image. Determining the target image region is not determining an image region randomly, but determining an image region including the target image object as the target image region. The terminal may perform image detection on the original image by using an image object detection method, to determine the target image region in the original image. The image object detection method is a method for positioning a target of interest in an image by using theories and methods in fields such as image processing and mode recognition, and giving a bounding box of each target after accurately determining a specific category of each target.

In an embodiment, a specific implementation of performing image detection on the original image to determine a target image region in the original image may be as follows:

invoking a preset first region detection model to perform image feature recognition on the original image, to obtain a region probability matrix, an element value $A_{uv}$ in the region probability matrix representing a probability that a corresponding pixel point $O_{uv}$ in the original image belongs to the target image region, u representing a row number, and v representing a column number; performing binarization processing on the region probability matrix by using a preset threshold, to obtain a feature element value region; and determining the target image region according to the feature element value region. For a specific process, refer to FIG. 5. Data features of an inputted original image 10 may be extracted first, to determine an initial image region including a target image object. Then, pixel-level recognition is performed on the original image 10. The so-called pixel-level recognition refers to recognizing which type of target image each pixel in the image belongs to, and sequentially determining whether each pixel in the original image 10 is a pixel in the initial image region. In an embodiment, the original image 10 may be stored as an array in a computer, and a value of each pixel (element) in the array is brightness (gray scale) of an image point. Therefore, a rectangular coordinate system, that is, a pixel plane coordinate system u-v, may be defined on the original image 10. Coordinates (u, v) of each pixel represent a row number and a column number of the pixel in the array. Therefore, it may be determined, according to the pixel coordinates of each pixel, whether each pixel in the original image 10 is a pixel in the initial image region.

After recognition of all pixels is completed, a region probability matrix having a same resolution as the original image 10 may be obtained. Then, the preset first region detection model may perform binarization processing on the region probability matrix by using a preset threshold, to obtain a binary image, that is, a feature element value region 22. Specifically, first of all, it is sequentially determined whether probability values of the region probability matrix are greater than the preset threshold. A position at which a probability value is less than the threshold is represented by a black color on the binary image; a position at which a probability value is greater than or equal to the threshold is represented by a white color on the binary image, thereby obtaining the feature element value region 22 shown in FIG. 5. Then, the target image region is determined according to the feature element value region 22.

Figure 5:
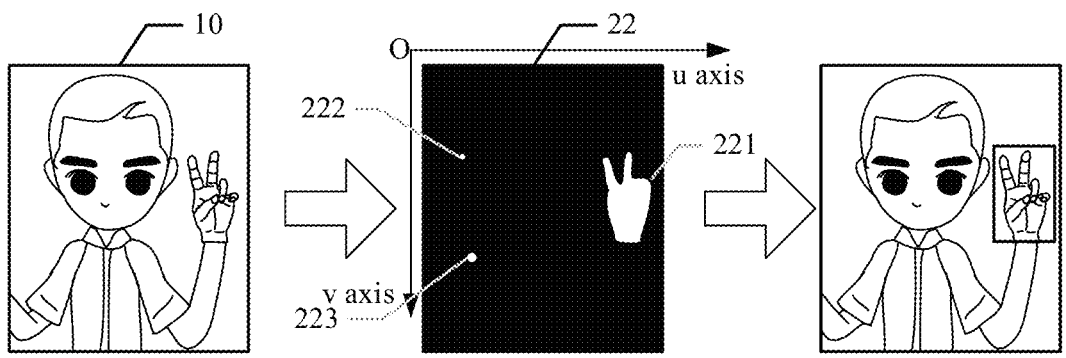
FIG. 5 is a schematic diagram of a process of determining a target image region by using a preset first region detection model according to an embodiment of the present disclosure.

In the process of obtaining the feature element value region 22, due to factors such as a calculation error, the obtained feature element value region 22 may include a plurality of white regions, for example, a scattered region 222 and a scattered region 223 in FIG. 5. Therefore, in an embodiment, a specific implementation of determining the target image region according to the feature element value region 22 may be as follows: determining a maximum continuous region 221 according to pixel coordinates of each pixel value in the feature element value region 22; and determining the target image region according to pixel coordinates of each pixel value in the maximum continuous region 221. Specifically, a maximum u value and a minimum u value are respectively determined on a horizontal u axis of the feature element value region 22, and a maximum v value and a minimum v value are respectively determined on a vertical v axis of the feature element value region 22. Then, the target image region is determined according to the determined maximum u value, minimum u value, maximum v value and minimum v value. The shape of the target image region may be a rectangular frame.

The maximum u value may represent a horizontal coordinate of a rightmost pixel point in the maximum continuous region, or may represent a horizontal coordinate obtained by extending rightward for Z pixel points from the rightmost pixel point in the maximum continuous region. The minimum u value may represent a horizontal coordinate of a leftmost pixel point in the maximum continuous region, or may represent a horizontal coordinate obtained by extending leftward for Z pixel points from the leftmost pixel point in the maximum continuous region. The maximum v value may represent a vertical coordinate of a lowermost pixel point in the maximum continuous region, or may represent a vertical coordinate obtained by extending downward for Z pixel points from the lowermost pixel point in the maximum continuous region. The minimum v value may represent a vertical coordinate of an uppermost pixel point in the maximum continuous region, or may represent a vertical coordinate obtained by extending upward for Z pixel points from the uppermost pixel point in the maximum continuous region. Z is a positive integer. For example, Z is any positive integer from 1 to 5.

In an embodiment, the first region detection model may be a detection model based on a convolutional neural network. The first region detection model may be optimized according to a plurality of sample images and annotated images corresponding to the sample images, to obtain the preset first region detection model. The annotated image refers to an image annotated with a target image region based on a corresponding sample image. In a process of optimizing the first region detection model, a sample image may be first inputted to the first region detection model, and the first region detection model may perform image detection on the sample image, to obtain a detection image. Then, the detection image may be compared with a corresponding annotated image, and parameters in the first region detection model, such as a convolution parameter in the convolutional neural network, are optimized according to a comparison result. The first region detection model is optimized multiple times by using a plurality of sample images and corresponding annotated images, until the comparison result between each detection image, which is obtained after the first region detection model performs image detection on each sample image, and the corresponding annotated image meets a preset condition. Then, the optimization operation for the first region detection model is finished, to obtain the preset first region detection model.

In a case that the target image object accounts for a small proportion of the original image, there may be a recognition error when image detection is performed on the original image by using the foregoing preset first region detection model (that is, the detection model based on the convolutional neural network). Therefore, in addition to the detection model based on the convolutional neural network, an embodiment of the present disclosure provides another preset first region detection model, where the preset first region detection model may be a model based on an optimized semantic segmentation network. The semantic segmentation network can not only perform convolution calculation on the original image to extract an image feature in the original image, but also perform downsampling processing and upsampling processing on the extracted image feature. The downsampling processing can reduce a resolution of the image feature, to reduce data points of non-target image objects in the original image, thereby improving recognition precision. The upsampling processing can increase the resolution of the image feature, so that a resolution of the finally obtained region probability matrix is the same as a resolution of the original image. Therefore, the preset first region detection model can accurately determine the target image region according to the region probability matrix.

The semantic segmentation network can perform image detection and pixel recognition on the original image, to obtain the region probability matrix. Therefore, the semantic segmentation network can be optimized by using a plurality of sample images and corresponding sample probability matrices. In the optimization process, sample images may be inputted to the semantic segmentation network, so that a series of operations such as image detection are performed, to obtain detection probability matrices. Then, the detection probability matrices are compared with the corresponding sample probability matrices. Parameters in the semantic segmentation network, such as a convolution parameter, a downsampling parameter, an upsampling parameter and fusion parameter, are optimized according to comparison results.

Figure 6:
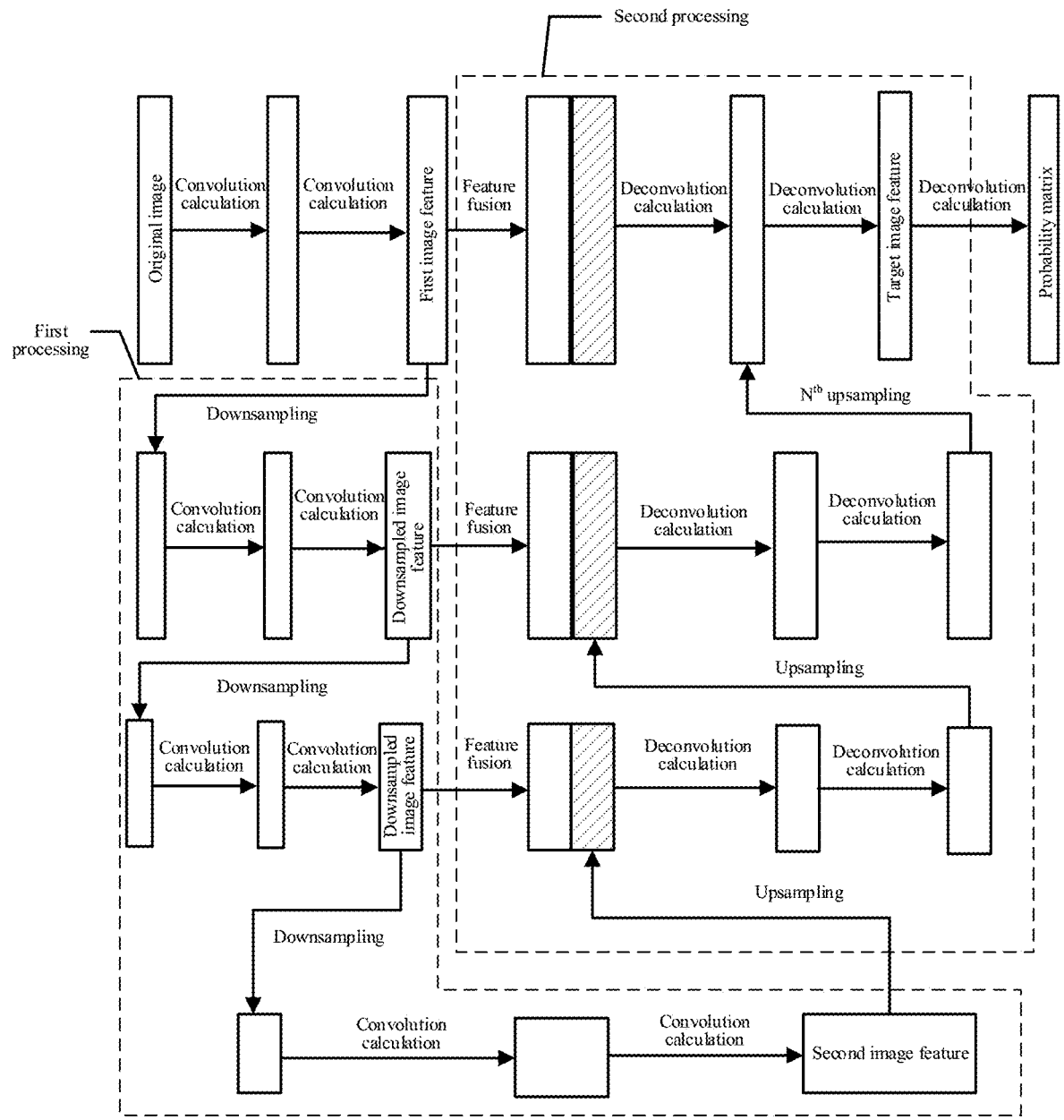
FIG. 6 is a schematic structural diagram of a semantic segmentation network according to an embodiment of the present disclosure.

In an embodiment, a schematic structural diagram of the semantic segmentation network is shown in FIG. 6. Correspondingly, a specific implementation of invoking a preset first region detection model to perform image feature recognition on the original image to obtain a region probability matrix may be as follows: performing convolution calculation on the original image, to obtain a first image feature; performing, on the first image feature, first processing based on a downsampling processing mode, to obtain a second image feature, where a resolution of the second image feature obtained after the first processing is lower than a resolution of the first image feature. The first image feature is obtained by performing convolution calculation on the original image. By performing, on the first image feature, the first processing based on the downsampling processing mode, the resolution of the image feature may be reduced, to reduce data points of non-target image objects in the original image, thereby recognizing the target image object more accurately, and improving the recognition precision.

In an embodiment, the first processing based on the downsampling processing mode includes N times of downsampling processing and M sets of convolution calculation processing, and the downsampling processing includes processing of downsampling the first image feature and downsampling a downsampled image feature obtained after each set of convolution calculation processing, N and M both being positive integers. In an embodiment, one downsampling operation and one set of convolution calculation processing are performed alternately, and the second image feature is an image feature obtained after the $M^{th}$ set of convolution calculation.

After the second image feature is obtained, second processing based on an upsampling and fusion processing mode may be performed on the second image feature, to obtain a target image feature, a resolution of the target image feature obtained after the second processing being the same as a resolution of the original image. The region probability matrix is obtained according to the target image feature. Therefore, the second processing based on the upsampling and fusion processing mode is performed on the second image feature, so that the resolution of the image feature may be increased through upsampling, and by fusing feature information of different feature dimensions, the resolution of the target image feature obtained after the second processing is the same as the resolution of the original image and the target image feature is more robust. In this way, the resolution of the finally obtained region probability matrix is the same as the resolution of the original image, so that the preset first region detection model can accurately determine the target image region according to the region probability matrix.

In an embodiment, the second processing based on the upsampling and fusion processing mode includes N times of upsampling processing, N times of feature fusion processing and M sets of deconvolution calculation processing; the upsampling processing includes processing of upsampling the second image feature and upsampling an image feature obtained after each set of deconvolution calculation processing; and the feature fusion processing is processing of fusing an image feature obtained after each upsampling processing with a corresponding downsampled image feature that has a same resolution or the first image feature.

In an embodiment, one upsampling operation and one set of deconvolution calculation processing may be performed alternately, and after completion of each upsampling, feature fusion processing is performed on an image feature obtained after each upsampling processing and corresponding downsampled image feature that has the same resolution, to obtain an image feature after the feature fusion processing. Then, deconvolution calculation processing is performed on the image feature obtained after the feature fusion processing. The $N^{th}$ feature fusion is fusing an image feature obtained after the $N^{th}$ upsampling with the first image feature, and the target image feature is an image feature obtained after M sets of deconvolution calculation. Deconvolution calculation is performed on the target image feature, to obtain the region probability matrix. By performing downsampling processing and convolution calculation processing on the image feature alternately, visual features (such as the shape, texture, and color) and semantic features of the original image can be extracted. Values of N and M may be determined according to an actual service requirement. Experiments show that the obtained probability matrix is more accurate with a greater value of N.

In another embodiment, image detection is performed on the original image. Alternatively, a specific implementation of determining a target image region in the original image may be as follows: invoking a preset second region detection model to process the original image, to obtain quadruple data (i.e. 4-tuple data), where the second region detection model performs image feature extraction processing on the original image, and obtains the quadruple data according to the extracted image feature; and determining the target image region according to the quadruple data, the quadruple data including a u-direction offset (a first offset) and a v-direction offset (a second offset) obtained relative to a central point of the target image region, as well as a width value and a height value of the target image region. Based on u, v, the width and the height, a target image region may be obtained.

Figure 7:
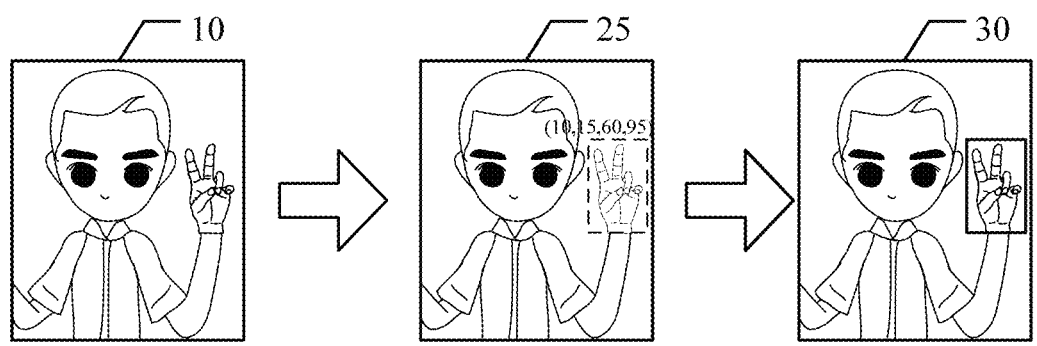
FIG. 7 is a schematic diagram of a process of determining a target image region by using a preset second region detection model according to an embodiment of the present disclosure.

Refer to FIG. 7 for a specific process of invoking a preset second region detection model to determine a target image region. An image feature of the original image 10 may be extracted first. Then, quadruple data is obtained according to the extracted image feature. Finally, a region position in the original image may be determined according to a first offset and a second offset in the quadruple data, a region size is determined according to a width value and a height value in the quadruple data, and the target image region is obtained according to the region position and the region size.

In an embodiment, a specific implementation of determining the target image region according to the quadruple data by the second region detection model may be as follows: For example, a rectangular frame is used for representing the target image region, the quadruple data includes a u-direction offset and a v-direction offset obtained relative to a central point of the target image region, as well as a width and a height of the target image region, as shown in by 25 in FIG. 7. The u-direction offset refers to an offset of a vertex at the upper left corner of the rectangular frame relative to the central point in a u direction, and the v-direction offset refers to an offset of the vertex at the upper left corner of the rectangular frame relative to the central point in a v direction. Therefore, coordinates of the central point may be recognized. Then, coordinates of the vertex at the upper left corner of the rectangular frame may be determined according to the coordinates of the central point, the u-direction offset, and the v-direction offset. The size of the rectangular frame is determined according to the coordinates of the vertex at the upper left corner and the width and height values in the quadruple data, as shown by 30 in FIG. 7. In other embodiments, the u-direction offset and the v-direction offset may refer to a u-direction offset and a v-direction offset of another vertex (such as coordinates of a vertex at an upper right corner) of the rectangular frame relative to the central point.

In an embodiment, the second region detection model may be a detection model based on a convolutional neural network. The second region detection model may be optimized according to a plurality of sample images and corresponding annotated images, to obtain the preset second region detection model. The optimization process of the second region detection model is similar to the foregoing optimization process of the first region detection model. In an embodiment, the sample images and quadruple data of a target image region that includes a target image object in each sample image are already known. After the sample images are inputted to a constructed detection model based on the convolutional neural network, if finally outputted quadruple data is the same as the known quadruple data of the sample images or a preset error is met, it is considered that the constructed detection model based on the convolutional neural network can perform prediction desirably. Otherwise, related parameters in the constructed detection model based on the convolutional neural network need to be adjusted. After numerous images including various hand gestures are recognized as sample images, the second region detection model capable of recognizing the target image object in the original image that includes a hand gesture may be finally obtained.

In another embodiment, in addition to the detection model based on the convolutional neural network, an embodiment of the present disclosure provides another preset second region detection model, where the preset second region detection model may be a model based on an optimized target detection network. The target detection network can not only perform convolution calculation on the original image to extract an image feature in the original image, but also perform downsampling processing, feature fusion processing, dimension conversion, and the like on the extracted image feature, to obtain quadruple data. The downsampling processing can reduce a resolution of the image feature, to reduce data points of non-target image objects in the original image, thereby improving recognition precision. In the feature fusion processing, a more robust image feature may be learned by using information of different feature dimensions. Through dimension conversion, the image feature may be converted into a feature vector, so that feature fusion processing can be performed to obtain quadruple data, thereby improving processing efficiency.

An initially constructed target detection network may be optimized by using a plurality of sample images and corresponding sample quadruple data, to finally obtain the preset second region detection model. In the optimization process, sample images may be inputted to the target detection network, so that a series of operations such as image feature extraction are performed, to obtain detection quadruple data. The detection quadruple data is compared with the sample quadruple data. Parameters of the target detection network, such as a downsampling parameter, a convolution calculation parameter, and a feature fusion processing parameter, are optimized according to a comparison result.

Figure 8:
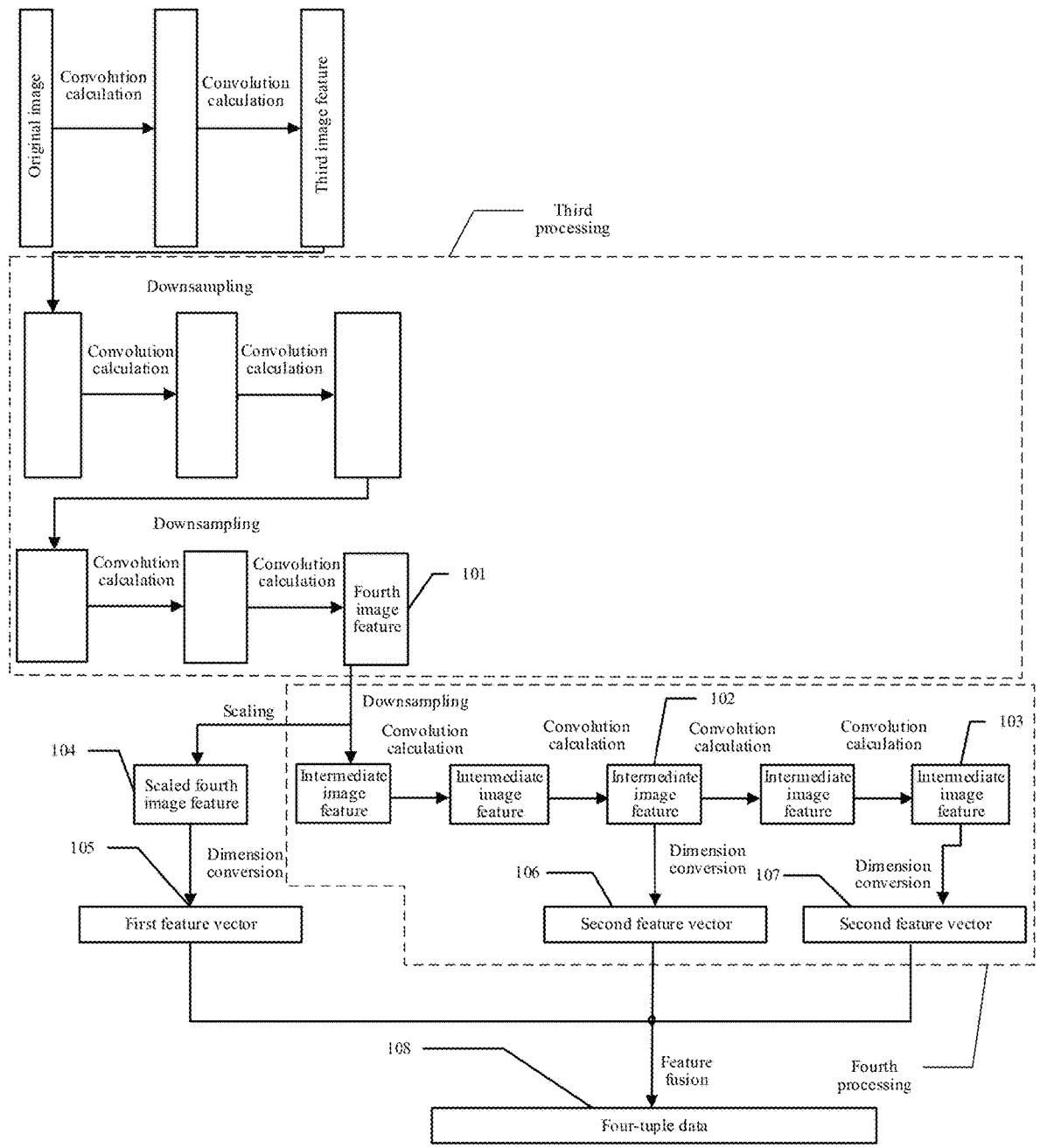
FIG. 8 is a schematic structural diagram of a target detection network according to an embodiment of the present disclosure.

In an embodiment, a schematic structural diagram of the target detection network is shown in FIG. 8. Correspondingly, a specific implementation of processing the original image by using the preset second region detection model to obtain quadruple data may be as follows: performing convolution calculation on the original image to obtain a third image feature; performing third processing on the third image feature, to obtain a fourth image feature, the third processing including R times of downsampling processing and S sets of convolution calculation processing, and the downsampling processing including processing of downsampling the third image feature and downsampling an image feature obtained after each set of convolution calculation processing, and R and S both being positive integers. In an embodiment, one downsampling operation and one set of convolution calculation processing may be performed alternately. By performing downsampling processing and convolution calculation processing on the image feature alternately, visual features (such as the shape, texture, and color) and semantic features of the original image can be extracted. Values of R and S may be determined according to an actual service requirement. Experiments show that the finally obtained quadruple data is more accurate with a greater value of R.

Fourth processing is performed on the fourth image feature to obtain an intermediate image feature, the fourth processing including convolution calculation processing; dimension conversion is performed on the fourth image feature, to obtain a first feature vector, and dimension conversion is performed on the intermediate image feature, to obtain a second feature vector; and feature fusion is performed on the first feature vector and the second feature vector to obtain the quadruple data.

In an embodiment, the fourth processing may further include: performing downsampling processing on the fourth image feature, and performing convolution calculation processing on an intermediate image feature obtained after the downsampling processing. Correspondingly, a specific implementation of performing dimension conversion on the fourth image feature to obtain a first feature vector may be as follows: performing scaling processing on the fourth image feature to obtain a scaled fourth image feature, a resolution of the scaled fourth image feature being the same as a resolution of the intermediate image feature; and performing dimension conversion on the scaled fourth image feature to obtain the first feature vector.

There may be more than one intermediate image feature. For example, as shown in FIG. 8, a fourth image feature 101 and intermediate image features 102 and 103 are selected. Because the resolution of 101 is higher than that of 102 and 103, scaling processing is performed on 101, to obtain a scaled fourth image feature 104. Then, dimension conversion is performed on 104, to obtain a first feature vector 105; dimension conversion is performed on 102 and 103 respectively, to obtain second feature vectors 106 and 107. Feature fusion processing is performed on 105, 106 and 107, to obtain quadruple data 108.

After the target image region is determined through the foregoing method, in S103, image cropping may be performed on the original image according to the target image region, to obtain a subimage including the target image object. Image cropping may be performed on the original image according to the target image region, to obtain a cropped image, the cropped image including the target image object, and a size of the cropped image being not larger than a size of the target image region. Then, a resolution of the cropped image is adjusted to obtain the subimage, a resolution of the subimage being a target resolution. After image cropping is completed to obtain the subimage, a subsequent node recognition model can recognize and confirm a node position more quickly and accurately.

After the subimage having the target resolution is obtained, in S104, a preset node recognition model is invoked to perform node recognition on the subimage, to obtain node recognition information of the target image object. In an embodiment, the node recognition model may be a recognition model based on a convolutional neural network. The node recognition model may be optimized according to a plurality of sample images and corresponding sample node recognition information, to obtain the preset node recognition model. In the optimization process, sample images may be inputted to the node recognition model for node recognition, to obtain detection node recognition information. The detection node recognition information is compared with the corresponding sample node recognition information, and parameters of the node recognition model are optimized according to a comparison result. The node recognition model is optimized multiple times by using a plurality of sample images and corresponding sample node recognition information, until the comparison result between detection node recognition information, which is obtained after the node recognition model performs node recognition on each sample image, and the corresponding sample node recognition information meets a preset condition. Then, the optimization operation for the node recognition model is finished, to obtain the preset node recognition model.

In an embodiment, in addition to the recognition model based on the convolutional neural network, an embodiment of the present disclosure provides another preset node recognition model, where the preset node recognition model may be a model based on an optimized node recognition network. The node recognition network can not only perform convolution calculation processing on the subimage to extract an image feature in the subimage, but also learn node information of the extracted image feature at least twice. In the learning process, downsampling processing, upsampling processing, and feature fusion processing may be performed on the extracted image feature. The downsampling processing can reduce the resolution of the image feature and increase a receptive field of a convolution kernel, thereby improving recognition precision. The upsampling processing can increase the resolution of the image feature. With a higher resolution of the image feature obtained after the upsampling processing, the node position is more precise. Through the feature fusion processing, feature fusion learning may be performed on the recognized intermediate node recognition information and a high-resolution image feature, thereby correcting and fine-tuning the node position and structure and improving the precision of node recognition information.

For the node recognition model, parameters in the node recognition network, such as a convolution processing parameter, a downsampling processing parameter, a feature fusion processing parameter, and an upsampling processing parameter, may be optimized by using a plurality of sample images and known node probability matrices corresponding to the sample images, to obtain the preset node recognition model by training and optimizing the initially constructed node recognition network. In an embodiment, after the sample images are inputted to the initially constructed node recognition network, the initially constructed node recognition network may perform a series of operations such as convolution calculation, node recognition processing, node information prediction processing and node information adjustment processing on the sample images.

After receiving the sample images, the initially constructed node recognition network may perform convolution calculation on the sample images to obtain convolutional image features. During node recognition processing, the node recognition network may perform downsampling processing and convolution calculation processing on the convolutional image features to obtain first node recognition features. Downsampling and convolution calculation are performed on the first node recognition features, to obtain intermediate node recognition features. The node recognition network may perform node information prediction processing on the intermediate node recognition features, to obtain at least one group of initial node probability matrices. Each group of initial node probability matrices includes node probability matrices of P channels, the node probability matrix of each channel represents a position probability distribution state of a corresponding node in the sample image, and a value of P depends on a node quantity in the sample image. The node recognition network may invoke a loss function to calculate loss values of the initial node probability matrix and known node probability matrix corresponding to the sample image, and parameters in the node recognition network are optimized according to a calculation result. The node recognition feature mentioned above refers to an image feature corresponding to a node in the target image object.

After the node information prediction processing is completed, a second node recognition feature may be obtained. The node recognition network may perform node information adjustment processing on the second node recognition feature, to obtain a final node probability matrix of the sample image. After numerous images with known node probability matrices are recognized as sample images, the preset node recognition model capable of performing node recognition on the subimage including the target image object may be finally obtained.

Figure 9:
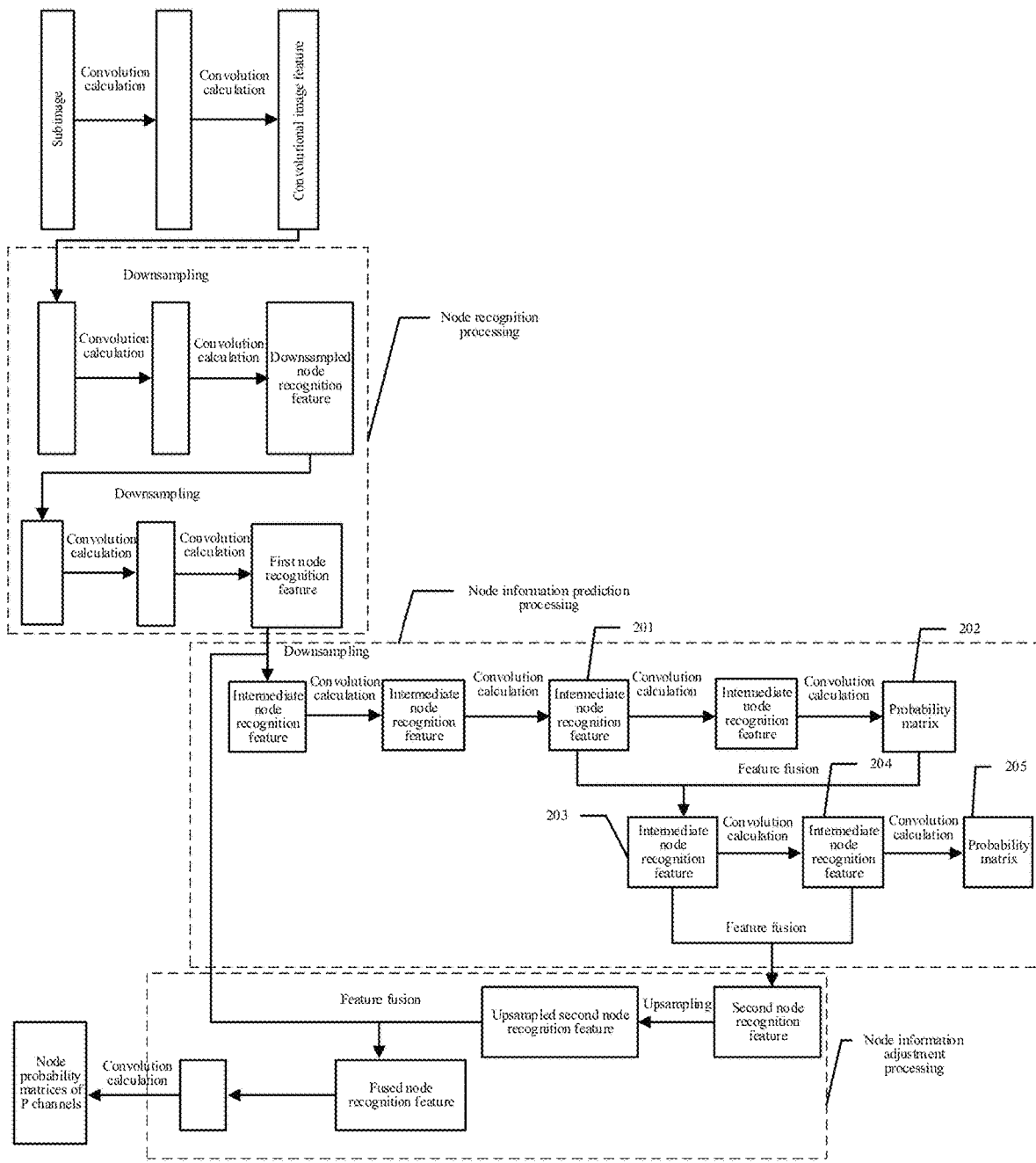
FIG. 9 is a schematic structural diagram of a node recognition network according to an embodiment of the present disclosure.

In an embodiment, a schematic structural diagram of the node recognition network is shown in FIG. 9. Correspondingly, a specific implementation of invoking a preset node recognition network to perform node recognition on the subimage to obtain node recognition information of the target image object may be as follows: performing node recognition on the subimage, to obtain node probability matrices of P channels, the node probability matrix of each channel representing a position probability distribution state of a corresponding node in the original image, and a value of P being equal to a node quantity in the target image object; and obtaining the node recognition information of the target image object according to the node probability matrices of the P channels, the node recognition information including image position information of each node of the target image object in the original image. In an embodiment, the position probability distribution state of each node of the target image object in the original image may be obtained according to the node probability matrices of the P channels first; the node recognition information of the target image object is obtained according to the position probability distribution state of each node of the target image object in the original image.

In an embodiment, a specific implementation of performing node recognition on the subimage to obtain node probability matrices of P channels may be as follows: performing convolution calculation on the subimage to obtain a convolutional image feature; performing node recognition processing on the convolutional image feature, to obtain a first node recognition feature, the node recognition processing including K times of downsampling processing and J sets of convolution calculation processing, and the downsampling processing including processing of downsampling the convolutional image feature and downsampling a downsampled node recognition feature obtained after each set of convolution calculation processing, and K and J both being positive integers; and obtaining the node probability matrices of the P channels according to the first node recognition feature.

In an embodiment, a specific implementation of obtaining the node probability matrices of the P channels according to the first node recognition feature may be as follows: performing convolution calculation on the first node recognition feature at least once, to obtain the node probability matrices of the P channels. In another embodiment, downsampling processing may be performed on the first node recognition feature first, and then convolution calculation is performed at least once on the first node recognition feature obtained after the downsampling processing, to obtain the node probability matrices of the P channels.

In another embodiment, a specific implementation of obtaining the node probability matrices of the P channels according to the first node recognition feature may alternatively be as follows: obtaining a second node recognition feature according to the first node recognition feature; performing node information adjustment processing on the first node recognition feature and the second node recognition feature, to obtain the node probability matrices of the P channels. The node information adjustment processing includes X sets of convolution calculation, and Y times of upsampling processing and feature fusion processing. The upsampling processing includes: processing of upsampling the second node recognition feature and/or upsampling a node recognition feature obtained after each set of convolution calculation processing. The feature fusion processing includes processing of fusing a node recognition feature obtained after each upsampling processing with a corresponding downsampled node recognition feature having a same resolution. The convolution calculation processing includes processing of convolution calculation on a fused node recognition feature obtained after the feature fusion processing. X and Y are both positive integers. The first node recognition feature may alternatively be referred to as a downsampled node recognition feature. If the first node recognition feature has the same resolution as the second node recognition feature, upsampling processing may not be performed on the second node recognition feature, and feature fusion may be directly performed on the second node recognition feature and the first node recognition feature.

In an embodiment, in the process of obtaining the second node recognition feature according to the first node recognition feature, downsampling processing and/or convolution calculation processing may be performed on the first node recognition feature, to obtain an intermediate node recognition feature. Node information prediction processing is performed on the intermediate node recognition feature, to obtain the second node recognition feature. In an embodiment, a set of convolution calculation processing may be performed on the intermediate node recognition feature, to obtain a probability matrix. The probability matrix, together with a loss function, may be used for optimizing parameters of the node recognition model in the process of optimizing the node recognition model. In the process of performing a set of convolution calculation processing on the intermediate node recognition feature, intermediate node recognition features may be obtained, and at least two intermediate node recognition features may be selected for feature fusion, to obtain the second node recognition feature.

In another embodiment, for the process of the node information prediction processing, refer to the node information prediction processing part in FIG. 9. The node information prediction processing includes A sets of convolution calculation processing and B times of feature fusion processing. The feature fusion processing is processing of feature fusion performed according to an intermediate node recognition feature inputted to each set of convolution calculation processing and a probability matrix obtained after convolution calculation processing. Moreover, the intermediate node recognition feature obtained after each feature fusion processing is used as a node recognition feature to be inputted to the next set of convolution calculation processing. A $B^{th}$ feature fusion is processing of feature fusion performed according to at least two intermediate node recognition features in an $A^{th}$ set of convolution calculation processing, where A and B are both positive integers. For example, values of A and B are both 2, that is, two sets of convolution calculation processing and two feature fusion processing operation are performed. As shown in FIG. 9, an intermediate node recognition feature 201 is selected as a node recognition feature to be inputted to the first set of convolution calculation processing. One set of convolution calculation processing may be performed on 201 first, to obtain a probability matrix 202. Then, the first feature fusion is performed according to 201 and 202, to obtain an intermediate node recognition feature 203, 203 is used as a node recognition feature to be inputted to the second set of convolution calculation processing, and the second set of convolution calculation processing is performed on 203, to obtain an intermediate node feature 204 and a probability matrix 205. Then, the second feature fusion is performed according to 203 and 204, to obtain a second node recognition feature. Both the probability matrices 202 and 205, together with a loss function, may be used for optimizing parameters of the node recognition model in the process of optimizing the node recognition model.

In an embodiment, the node recognition information includes image position information of each node of the target image object in the original image. After the node recognition information of the target image object is obtained, a node connection image of the target image object may further be obtained according to the node recognition information of the target image object. For example, if the target image object is a hand, the node recognition information of the target image object may include position information and direction information of key nodes of a palm. The nodes may be connected in a preset connection order according to the position information and direction information of the key nodes, thereby obtaining a hand gesture skeleton image. For example, the nodes of the palm shown in FIG. 1 may be numbered in advance, and the preset connection order may be: 1-2-3-4-21-22, 5-6-7-8-21-22, 9-10-11-12-21-22, 13-14-15-16-21-22, and 17-18-19-20-21-22. After the position information and the direction information of the nodes are obtained, the hand gesture skeleton image shown in FIG. 2 may be determined according to the preset connection order.

In an embodiment, after the node connection image of the target image object is obtained, the node connection image may be outputted in a coordinate system. In another embodiment, the node connection image may alternatively be superposed onto the original image, to obtain and display the superposed image.

In some embodiments of the present disclosure, after a to-be-recognized original image is obtained, through image detection and cropping, a subimage including a target image object is inputted to a node recognition network for node recognition, to avoid the problem of inaccurate node recognition when a target image region accounts for a small proportion of the original image, thereby improving the recognition precision and meeting the requirement of elaborate hand gesture recognition.

Steps in the flowchart in FIG. 4 are displayed in sequence based on indication of arrows, but the steps are not necessarily performed sequentially based on the sequence indicated by the arrows. Unless otherwise explicitly specified in the present disclosure, execution of the steps is not strictly limited, and the steps may be performed in other sequences. In addition, at least some steps in FIG. 4 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 10:
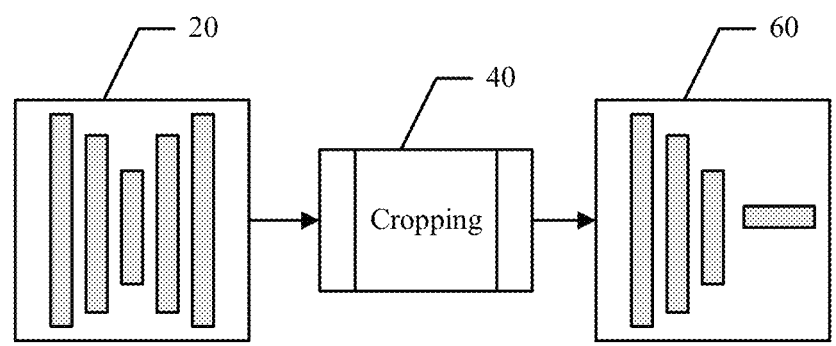
FIG. 10 is a schematic structural diagram of a recognition model for recognizing an object node in an image according to an embodiment of the present disclosure.

Based on the description of the foregoing method embodiment, an embodiment of the present disclosure further provides a schematic structural diagram of a recognition model for recognizing an object node in an image, as shown in FIG. 10. The schematic structural diagram may be formed by a region detection model 20, a join module 40 in the middle, and a node recognition model 60. The region detection model 20 is configured to perform image detection on a to-be-recognized original image, and determine a target image region in the original image. The join module 40 is configured to perform image cropping on the original image according to the target image region, to obtain a subimage including a target image object. The node recognition model 60 is configured to perform node recognition on the subimage, to obtain node recognition information of the target image object. In an embodiment, the target image object may be a hand.

Figure 11:
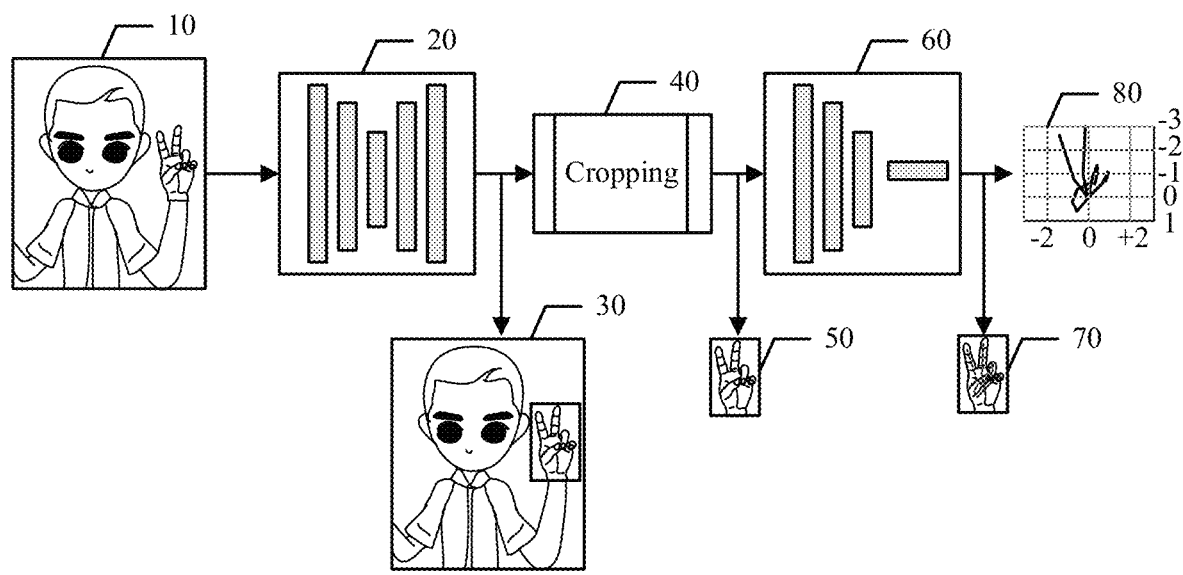
FIG. 11 is an application scenario diagram of recognition model according to an embodiment of the present disclosure.

Hand gesture skeleton recognition is used as an example to describe some embodiments of the present disclosure in detail. As shown in FIG. 11, a to-be-processed original image 10 may be obtained first, the original image including a hand gesture (that is, a target image object). The original image 10 may be inputted to the region detection model 20. The region detection model 20 may perform image detection on the original image 10, to obtain a detection image. The detection image is an image in which a target image region is determined in the original image. After the region detection model 20 performs the image detection, the obtained detection image may be shown by 30 in FIG. 11, where a rectangular frame in 30 may represent the target image region. Then, the detection image 30 is inputted to the join module 40. After receiving 30, the join module 40 may crop the original image 10 according to the target image region (such as the rectangular frame), to obtain a subimage 50 including a hand gesture. Then the subimage 50 is inputted to the node recognition model 60. The node recognition model 60 may perform node recognition on the subimage 50, to obtain node recognition information of the hand gesture (that is, the target image object). A node connection image shown by 70 or a node connection image shown by 80 may be obtained and displayed according to the node recognition information. In an embodiment, the node recognition information may include position information and direction information of main key nodes of a palm. After the node recognition information is obtained, a hand gesture skeleton image (that is, a node connection image of the target image object) may be obtained according to the node recognition information.

In an embodiment, the region detection model 20 may be the preset first region detection model described in the foregoing method embodiment, or may be the preset second region detection model described in the foregoing method embodiment. The node recognition model 60 may be the preset node recognition model described in the foregoing method embodiment. In some embodiments of the present disclosure, when the node recognition network model 60 is designed, performance characteristics of a terminal device (such as a mobile phone) are further taken into consideration, to make specific design and optimization.

It can be learned from the above description that the recognition model for recognizing an object node in an image is formed by the region detection model 20 and the node recognition model 60 that are connected in series through the join module 40, and has the following advantages:

Advantages of flexibility, high extensibility, and high reusability are achieved. The region detection model 20 and the node recognition model 60 are separated by the join module 40, so that specific design and optimization can be made for each model separately. For example, the node recognition model is not required to have high accuracy of recognizing the target image region. Therefore, in the present disclosure, detection accuracy of the target image region may be sacrificed to a certain extent to improve the execution performance of the network. In this way, the entire network can run more smoothly on the terminal device.

Networks in the models can be disassembled and assembled flexibly. For example, the network in the region detection model 20 may be the semantic segmentation network shown in FIG. 6 or the target detection network shown in FIG. 8. The node recognition model 60 may be the node recognition network shown in FIG. 9. With such a cascade structure, during updating of the network in the region detection model 20, it is unnecessary to modify the node recognition network shown in FIG. 9.

Advantages of high accuracy and excellent performance are achieved. The region detection model 20 may find the target image region first. The join module 40 obtains the target image region through cropping and then transmits the target image region to the node recognition model 60. In this way, the node recognition model 60 can focus on learning nodes and the structure between nodes, without paying attention to redundant information of numerous non-target image objects, thereby greatly improving the recognition accuracy, reducing the complexity of the model, and improving the performance of the model.

Figure 12:
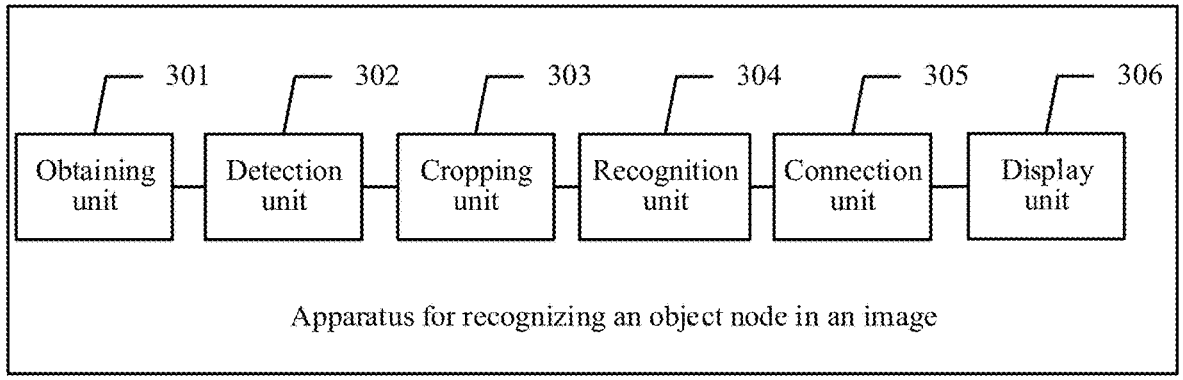
FIG. 12 is a schematic structural diagram of an apparatus for recognizing an object node in an image according to an embodiment of the present disclosure.

Based on the description of the foregoing method embodiment, an embodiment of the present disclosure further provides a schematic structural diagram of an apparatus for recognizing an object node in an image, as shown in FIG. 12. As shown in FIG. 12, the recognition apparatus in some embodiments of the present disclosure may include:

an obtaining unit 301, configured to obtain a to-be-recognized original image, the original image including a target image object;

a detection unit 302, configured to perform image detection on the original image, to determine a target image region in the original image, the object image region including the target image object;

a cropping unit 303, configured to perform image cropping on the original image according to the target image region, to obtain a subimage including the target image object; and a recognition unit 304, configured to invoke a preset node recognition model to perform node recognition on the subimage, to obtain node recognition information of the target image object.

In an embodiment, the detection unit 302 is specifically configured to: invoke a preset first region detection model to perform image feature recognition on the original image, to obtain a region probability matrix, an element value $A_{uv}$ in the region probability matrix representing a probability that a corresponding pixel point $O_{uv}$ in the original image belongs to the target image region, u representing a row number, and v representing a column number; perform binarization processing on the region probability matrix by using a preset threshold, to obtain a feature element value region; and determine the target image region according to the feature element value region.

In an embodiment, a specific implementation of invoking a preset first region detection model to perform image feature recognition on the original image to obtain a region probability matrix may be as follows: performing convolution calculation on the original image, to obtain a first image feature; performing, on the first image feature, first processing based on a downsampling processing mode, to obtain a second image feature, where a resolution of the second image feature obtained after the first processing is lower than a resolution of the first image feature; performing, on the second image feature, second processing based on an upsampling and fusion processing mode, to obtain a target image feature, where a resolution of the target image feature obtained after the second processing is the same as a resolution of the original image; and performing deconvolution calculation on the target image feature, to obtain the region probability matrix.

In an embodiment, the first processing based on the downsampling processing mode includes N times of downsampling processing and M sets of convolution calculation processing, and the downsampling processing includes downsampling the first image feature and downsampling a downsampled image feature obtained after each set of convolution calculation processing, N and M both being positive integers.

The second processing based on the upsampling and fusion processing mode includes N times of upsampling processing, N times of feature fusion processing and M sets of deconvolution calculation processing, the upsampling processing includes upsampling the second image feature and upsampling an image feature obtained after each set of deconvolution calculation processing, and the feature fusion processing includes fusing an image feature obtained after each upsampling processing with a corresponding downsampled image feature that has a same resolution.

In an embodiment, the detection unit 302 may be specifically configured to: invoke a preset second region detection model to process the original image to obtain quadruple data, where the second region detection model performs image feature extraction processing on the original image and obtains the quadruple data according to an extracted image feature; determine a region position in the original image according to a first offset and a second offset in the quadruple data; determine a region size according to a width value and a height value in the quadruple data; and obtain the target image region according to the region position and the region size.

In an embodiment, a specific implementation of processing the original image by using the preset second region detection model to obtain quadruple data may be as follows: performing convolution calculation on the original image to obtain a third image feature; performing third processing on the third image feature, to obtain a fourth image feature, the third processing including R times of downsampling processing and S sets of convolution calculation processing, and the downsampling processing including downsampling the third image feature and downsampling an image feature obtained after each set of convolution calculation processing, and R and S both being positive integers; performing fourth processing on the fourth image feature, to obtain an intermediate image feature, the fourth processing including convolution calculation processing; performing dimension conversion on the fourth image feature to obtain a first feature vector, and performing dimension conversion on the intermediate image feature to obtain a second feature vector; and performing feature fusion on the first feature vector and the second feature vector to obtain the quadruple data.

In an embodiment, the fourth processing further includes: performing downsampling processing on the fourth image feature, and performing convolution calculation processing on an image feature obtained after the downsampling processing. Correspondingly, a specific implementation of performing dimension conversion on the fourth image feature to obtain a first feature vector may be as follows: performing scaling processing on the fourth image feature to obtain a scaled fourth image feature, a resolution of the scaled fourth image feature being the same as a resolution of the intermediate image feature; and performing dimension conversion on the scaled fourth image feature to obtain the first feature vector.

In an embodiment, a specific implementation of invoking a preset node recognition model to perform node recognition on the subimage to obtain node recognition information of the target image object may be as follows: performing node recognition on the subimage, to obtain node probability matrices of P channels, the node probability matrix of each channel representing a position probability distribution state of a corresponding node in the original image, and a value of P being equal to a node quantity in the target image object; and obtaining the node recognition information of the target image object according to the node probability matrices of the P channels, the node recognition information including image position information of each node of the target image object in the original image.

In an embodiment, a specific implementation of performing node recognition on the subimage to obtain node probability matrices of P channels may be as follows: performing convolution calculation on the subimage to obtain a convolutional image feature; performing node recognition processing on the convolutional image feature, to obtain a first node recognition feature, the node recognition processing including K times of downsampling processing and J sets of convolution calculation processing, and the downsampling processing including downsampling the convolutional image feature and downsampling a downsampled node recognition feature obtained after each set of convolution calculation processing, and K and J both being positive integers; and obtaining the node probability matrices of the P channels according to the first node recognition feature.

In an embodiment, a specific implementation of obtaining the node probability matrices of the P channels according to the first node recognition feature may be as follows: obtaining a second node recognition feature according to the first node recognition feature; performing node information adjustment processing on the first node recognition feature and the second node recognition feature, to obtain the node probability matrices of the P channels. The node information adjustment processing includes X sets of convolution calculation, and Y times of upsampling processing and feature fusion processing. The upsampling processing includes: upsampling the second node recognition feature and/or upsampling a node recognition feature obtained after each set of convolution calculation processing. The feature fusion processing includes fusing a node recognition feature obtained after each upsampling processing with a corresponding downsampled node recognition feature having a same resolution. X and Y are both positive integers.

In an embodiment, the cropping unit 303 may be specifically configured to: perform image cropping on the original image according to the target image region, to obtain a cropped image, the cropped image including the target image object, and a size of the cropped image being not larger than a size of the target image region; and adjust a resolution of the cropped image to obtain the subimage, a resolution of the subimage being a target resolution.

In an embodiment, the node recognition information includes image position information of each node of the target image object in the original image, and the recognition apparatus further includes:

a connection unit 305, configured to obtain a node connection image of the target image object according to the node recognition information of the target image object; and a display unit 306, configured to superpose the node connection image onto the original image, to obtain and display a superposed image.

In some embodiments of the present disclosure, after a to-be-recognized original image is obtained by the obtaining unit 301, through image detection and cropping performed by the detection unit 302 and the cropping unit 303, a subimage including a target image object is inputted by the recognition unit 304 to a preset node recognition network for node recognition, to avoid the problem of inaccurate node recognition when a target image region accounts for a small proportion of the original image, thereby improving the recognition precision and meeting the requirement of elaborate hand gesture recognition.

Figure 13:
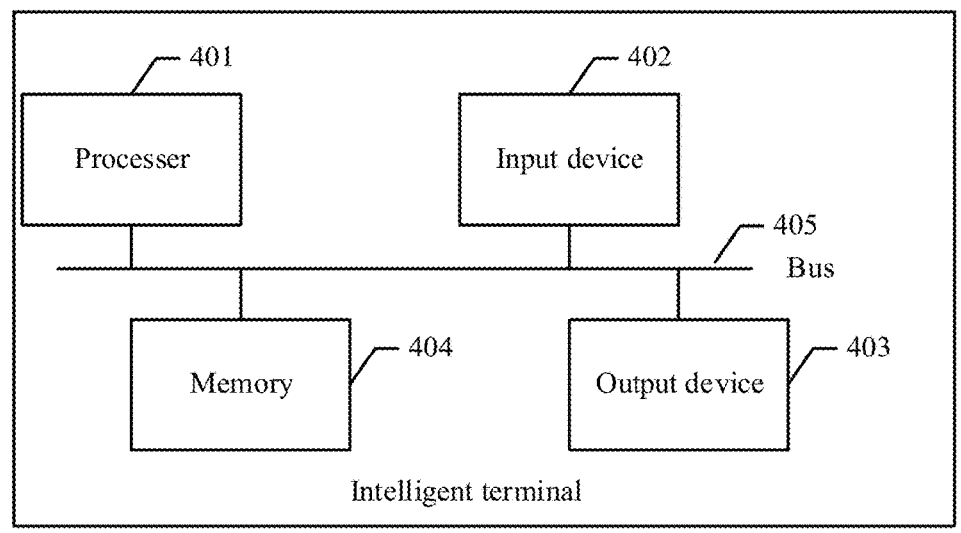
FIG. 13 is a schematic structural diagram of an intelligent terminal according to an embodiment of the present disclosure.

FIG. 13 is a schematic structural diagram of an intelligent terminal according to another embodiment of the present disclosure. The intelligent terminal in some embodiments shown in FIG. 13 may include: one or more processors 401, one or more input devices 402, one or more input devices 403, and a memory 404. The processor 401, the input device 402, the output device 403, and the memory 404 are connected through a bus 405. The memory 404 is configured to store a computer program. The computer program includes program instructions. The processor 401 is configured to execute the program instructions stored in the memory 404.

In some embodiments of the present disclosure, the processor 401 loads and executes one or more instructions stored in a computer-readable storage medium, to implement the steps of the method for recognizing an object node in an image in any of the foregoing embodiments.

The processor 401 may be a central processing unit (CPU). The processor may alternatively be another general-purpose processor, that is, a microprocessor or any conventional processor. The memory 404 may include a read-only memory and a random access memory, and provide instructions and data to the processor 401. Therefore, the processor 401 and the memory 404 are not limited herein.

In an embodiment, a non-volatile computer readable storage medium is provided, storing computer program instructions. When being executed by one or more processors, the computer program instructions cause the one or more processors to perform steps in the method for recognizing an object node in an image in any of the foregoing embodiments.

For a specific working process of the terminal and units described above, refer to the related descriptions in the foregoing embodiments. Details are not described herein again.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a RAM or an external cache. As an illustration instead of a limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a Rambus Direct RAM (RDRAM), a Direct Rambus Dynamic RAM (DRDRAM), and a Rambus Dynamic RAM (RDRAM).

The foregoing descriptions are merely some embodiments of the present disclosure, and are not intended to limit the scope of the present disclosure. A person of ordinary skill in the art may understand all or some processes of the foregoing embodiments, and equivalent modifications made according to the claims of the present disclosure shall still fall within the scope of the present disclosure.

What is claimed is:

1. A method for recognizing object nodes in an image, executed by a computer device, comprising:
    performing image detection on an original image, to determine a target image region that comprises a target image object, the original image being a two-dimensional image, by:
        invoking a preset second region detection model to perform convolution calculation on the original image, to obtain a third image feature;
        performing R times of downsampling processing and S sets of convolution calculation processing on the third image feature to obtain a fourth image feature, the R times of downsampling processing comprising downsampling the third image feature and downsampling an image feature obtained after each set of convolution calculation processing, and R and S each being a positive integer;
    performing convolution calculation processing on the fourth image feature to obtain an intermediate image feature;

performing dimension conversion on the fourth image feature to obtain a first feature vector, and performing dimension conversion on the intermediate image feature to obtain a second feature vector;

performing feature fusion on the first feature vector and the second feature vector to obtain quadruple data; and determining a region position in the original image according to a first offset and a second offset in the quadruple data, determining a region size according to a width value and a height value in the quadruple data, and obtaining the target image region according to the region position and the region size;

performing image cropping on the original image according to the target image region, to obtain a subimage comprising the target image object; and performing node recognition on the subimage based on a preset node recognition model, to obtain image position information of each node of the target image object in the original image.

2. The method according to claim 1, wherein the performing image detection on an original image, to determine a target image region comprises:

invoking a preset first region detection model to perform image feature recognition on the original image, to obtain a region probability matrix; and determining the target image region further according to the region probability matrix.

3. The method according to claim 2, wherein the invoking a preset first region detection model to perform image feature recognition on the original image, to obtain a region probability matrix comprises:

invoking the preset first region detection model to perform convolution calculation on the original image, to obtain a first image feature;

performing downsampling processing on the first image feature, to obtain a second image feature;

performing upsampling processing on the second image feature, to obtain a target image feature; and performing deconvolution calculation on the target image feature, to obtain the region probability matrix.

4. The method according to claim 3, wherein:

performing the downsampling processing comprises N times of downsampling processing and M sets of convolution calculation processing, N and M both being positive integers; and performing the upsampling processing comprises N times of upsampling processing and M sets of deconvolution calculation processing.

5. The method according to claim 1, wherein the processing the fourth image feature further comprises:

performing downsampling processing on the fourth image feature, and performing convolution calculation processing on an image feature obtained after the downsampling processing.

6. The method according to claim 1, wherein the performing node recognition on the subimage based on a preset node recognition model comprises:

invoking the preset node recognition model to perform node recognition on the subimage, to obtain node probability matrices of P channels; and obtaining the image position information of each node of the target image object according to the node probability matrices of the P channels.

7. The method according to claim 6, wherein the performing node recognition on the subimage, to obtain node probability matrices of P channels comprises:

performing convolution calculation on the subimage, to obtain a convolutional image feature;

performing node recognition processing on the convolutional image feature, to obtain a first node recognition feature; and obtaining the node probability matrices of the P channels according to the first node recognition feature.

8. The method according to claim 7, wherein the obtaining the node probability matrices of the P channels according to the first node recognition feature comprises:

obtaining a second node recognition feature according to the first node recognition feature; and performing node information adjustment processing on the first node recognition feature and the second node recognition feature, to obtain the node probability matrices of the P channels.

9. The method according to claim 1, wherein the performing image cropping on the original image according to the target image region, to obtain a subimage comprising the target image object comprises:

performing image cropping on the original image according to the target image region, to obtain a cropped image, the cropped image comprising the target image object; and adjusting a resolution of the cropped image to obtain the subimage.

10. The method according to claim 1, further comprising:

obtaining a node connection image of the target image object according to the image position information of each node of the target image object; and superposing the node connection image onto the original image, to obtain a superposed image.

11. The method according to claim 1, wherein the performing dimension conversion on the fourth image feature, to obtain a first feature vector comprises:

performing scaling processing on the fourth image feature, to obtain a scaled fourth image feature, a resolution of the scaled fourth image feature being the same as a resolution of the intermediate image feature; and performing dimension conversion on the scaled fourth image feature, to obtain the first feature vector.

12. An intelligent terminal, comprising a processor and a memory coupled to the processor, the processor being configured to:

perform image detection on an original image, to determine a target image region that comprises a target image object, the original image being a two-dimensional image, by:

invoking a preset second region detection model to perform convolution calculation on the original image, to obtain a third image feature;

performing R times of downsampling processing and S sets of convolution calculation processing on the third image feature to obtain a fourth image feature, the R times of downsampling processing comprising downsampling the third image feature and downsampling an image feature obtained after each set of convolution calculation processing, and R and S each being a positive integer;

performing convolution calculation processing on the fourth image feature to obtain an intermediate image feature;

performing dimension conversion on the fourth image feature to obtain a first feature vector, and performing dimension conversion on the intermediate image feature to obtain a second feature vector;

performing feature fusion on the first feature vector and the second feature vector to obtain quadruple data; and determining a region position in the original image according to a first offset and a second offset in the quadruple data, determining a region size according to a width value and a height value in the quadruple data, and obtaining the target image region according to the region position and the region size;

perform image cropping on the original image according to the target image region, to obtain a subimage comprising the target image object; and perform node recognition on the subimage based on a preset node recognition model, to obtain image position information of each node of the target image object in the original image.

13. The intelligent terminal according to claim 12, wherein the processor is further configured to:

invoke a preset first region detection model to perform image feature recognition on the original image, to obtain a region probability matrix; and determine the target image region further according to the region probability matrix.

14. The intelligent terminal according to claim 13, wherein the processor is further configured to:

invoke the preset first region detection model to perform convolution calculation on the original image, to obtain a first image feature;

perform downsampling processing on the first image feature, to obtain a second image feature;

perform upsampling processing on the second image feature, to obtain a target image feature; and perform deconvolution calculation on the target image feature to obtain a region probability matrix.

15. The intelligent terminal according to claim 14, wherein the processor is further configured to:

perform the downsampling processing comprises N times of downsampling processing and M sets of convolution calculation processing; and perform the upsampling and fusion processing comprises N times of upsampling processing.

16. The intelligent terminal according to claim 12, wherein the processor is further configured to:

obtain a node connection image of the target image object according to the image position information of each node of the target image object; and superpose the node connection image onto the original image, to obtain a superposed image.

17. The intelligent terminal according to claim 12, wherein the processing the fourth image feature further comprises:

performing downsampling processing on the fourth image feature, and performing convolution calculation processing on an image feature obtained after the downsampling processing.

18. The intelligent terminal according to claim 12, wherein the performing node recognition on the subimage based on a preset node recognition model comprises:

invoking the preset node recognition model to perform node recognition on the subimage, to obtain node probability matrices of P channels; and obtaining the image position information of each node of the target image object according to the node probability matrices of the P channels.

19. The intelligent terminal according to claim 12, wherein the performing image cropping on the original image according to the target image region, to obtain a subimage comprising the target image object comprises:

performing image cropping on the original image according to the target image region, to obtain a cropped image, the cropped image comprising the target image object; and adjusting a resolution of the cropped image to obtain the subimage.

20. A non-transitory computer-readable storage medium, storing a computer-readable instruction, the computer-readable instruction, when executed by one or more processors, causing the one or more processors to perform:

performing image detection on an original image, to determine a target image region that comprises a target image object, the original image being a two-dimensional image, by:

invoking a preset second region detection model to perform convolution calculation on the original image, to obtain a third image feature;

performing R times of downsampling processing and S sets of convolution calculation processing on the third image feature to obtain a fourth image feature, the R times of downsampling processing comprising downsampling the third image feature and downsampling an image feature obtained after each set of convolution calculation processing, and R and S each being a positive integer;

performing convolution calculation processing on the fourth image feature to obtain an intermediate image feature;

performing dimension conversion on the fourth image feature to obtain a first feature vector, and performing dimension conversion on the intermediate image feature to obtain a second feature vector;

performing feature fusion on the first feature vector and the second feature vector to obtain quadruple data; and determining a region position in the original image according to a first offset and a second offset in the quadruple data, determining a region size according to a width value and a height value in the quadruple data, and obtaining the target image region according to the region position and the region size;

performing image cropping on the original image according to the target image region, to obtain a subimage comprising the target image object; and performing node recognition on the subimage based on a preset node recognition model, to obtain image position information of each node of the target image object in the original image.

* * * * *